United States Patent [19]

Brandon

[11] 4,256,944
[45] Mar. 17, 1981

[54] APPARATUS AND METHOD FOR THAWING MATERIALS STORED IN GONDOLA-TYPE CONTAINERS

[76] Inventor: Deryck Brandon, P.O. Box 176, Charlottesville, Va. 22902

[21] Appl. No.: 28,601

[22] Filed: Apr. 9, 1979

[51] Int. Cl.³ .............................................. H05B 6/80
[52] U.S. Cl. .................................. 219/10.55 F; 34/1; 219/10.55 A; 219/10.55 D
[58] Field of Search ................. 219/10.55 M, 10.55 F, 219/10.55 R, 10.55 D, 10.55 A; 165/1; 105/451; 104/1; 34/1

[56] References Cited

U.S. PATENT DOCUMENTS

| | | | |
|---|---|---|---|
| 2,500,752 | 3/1950 | Hanson et al. | 219/10.55 A |
| 3,505,490 | 4/1970 | Gorn | 219/10.55 A |
| 3,560,347 | 2/1971 | Knapp et al. | 219/10.55 A |
| 3,569,657 | 3/1971 | Levinson | 219/10.55 R |
| 3,601,448 | 8/1971 | Stone | 219/10.55 M |
| 3,800,858 | 4/1974 | Placek | 105/451 X |
| 3,992,287 | 11/1976 | Rhys | 219/10.55 R |

FOREIGN PATENT DOCUMENTS 1092861 11/1967 United Kingdom .

*Primary Examiner*—Arthur T. Grimley
*Attorney, Agent, or Firm*—Oblon, Fisher, Spivak, McClelland & Maier

[57] ABSTRACT

An apparatus and method for thawing particulate material, such as coal, stored in gondola-type containers, such as rail cars, wherein the container is positioned in a shielded and grounded enclosure, and is engaged by a shielded hood having an open face matching the dimensions of the open face of the container to form a microwave cavity between the hood and the container. Plural magnetrons are located in the hood, and are energized upon formation of the microwave cavity, to emit microwave radiation into the material in the container, whereby the material is heated and thawing thereof takes place. Prior to formation of the microwave cavity, the top surface of the container open face is thoroughly cleaned, and during energization of the magnetrons, gases released by the particular matter being heated are evacuated from the microwave cavity. After energization of the magnetron for a selected period of time, the shielding hood is removed from the gondola-type container, and the container is then processed to an adjacent discharge cite exterior to the RF shielded enclosure. The apparatus and process is virtually entirely automated under the control of a centrally located microprocessor.

19 Claims, 12 Drawing Figures

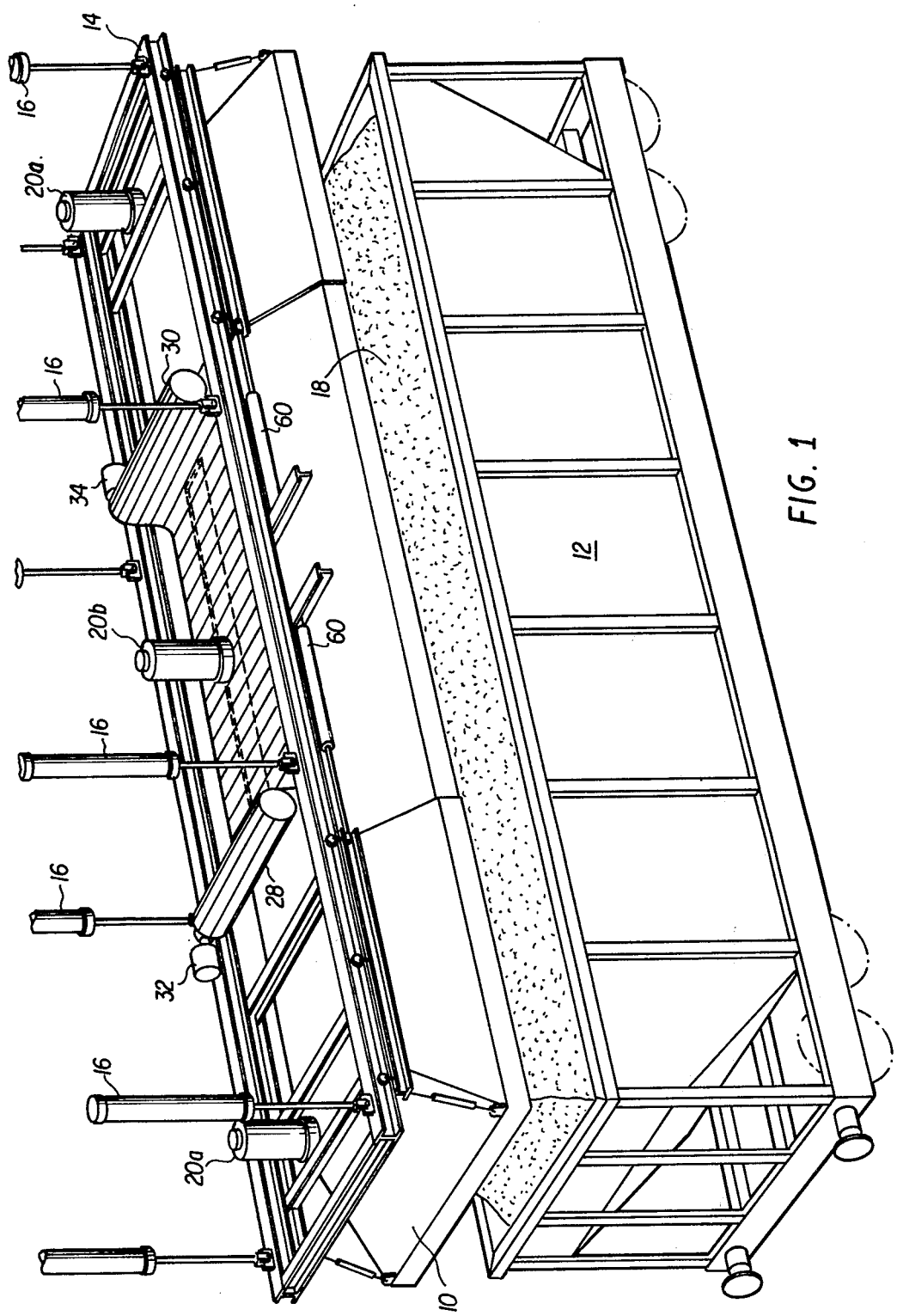

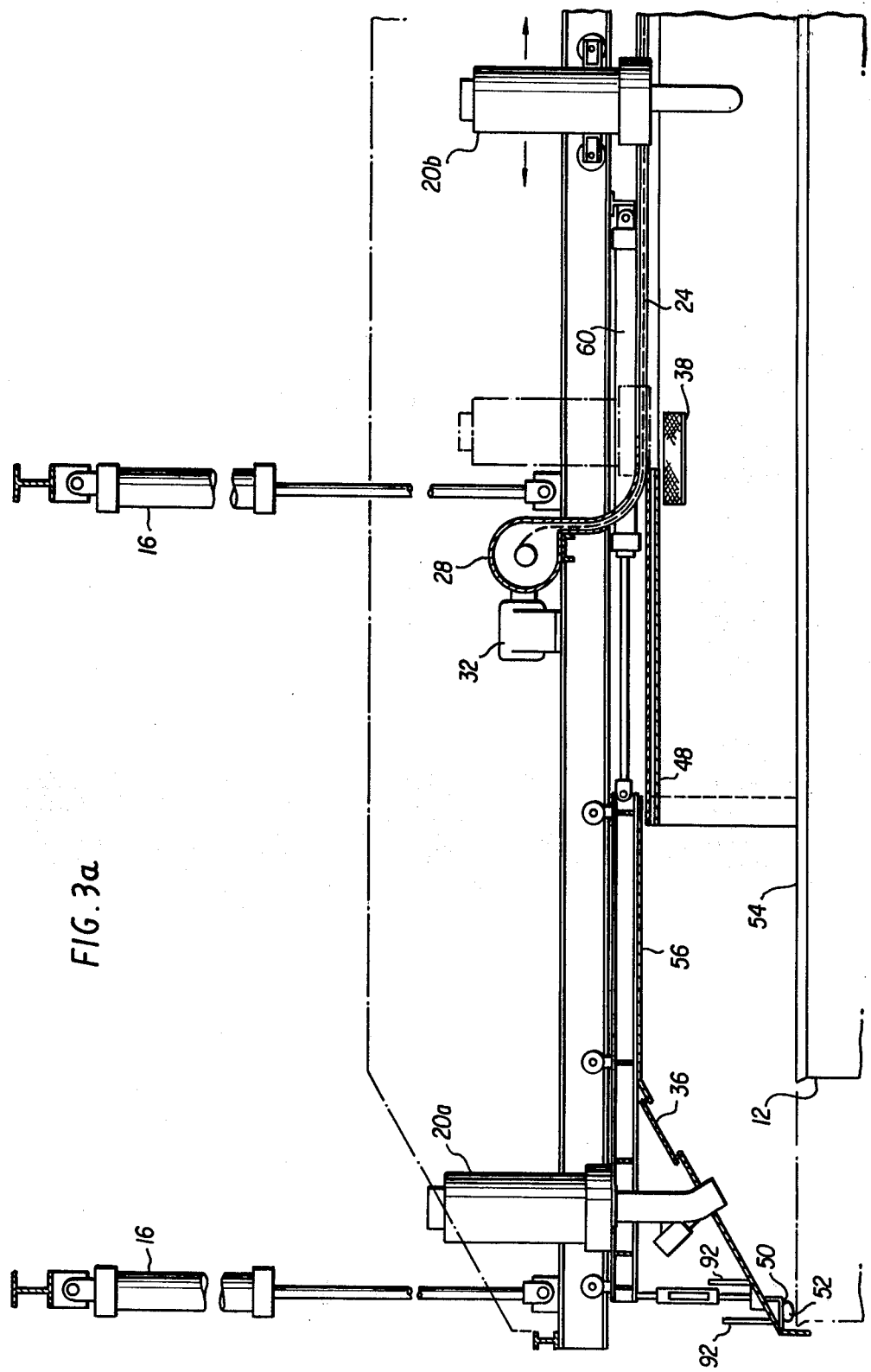

APPARATUS AND METHOD FOR THAWING MATERIALS STORED IN GONDOLA-TYPE CONTAINERS

BACKGROUND OF THE INVENTION

1. Field of the Invention

This invention relates to an apparatus and method for thawing materials carried in containers such as gondola rail cars, trucks and the like, and more particularly to such an apparatus and method employing microwave heating techniques during the thawing operation.

2. Description of the Prior Art

Many natural and man-made materials are most economically transported in broken or granular form by open rail cars. These rail cars collect moisture due to rain, high relative humidity, and the like. In cold or freezing weather below zero degrees celcius these materials often become frozen, and discharge thereof either from the bottom the cars or by various tipping or rotary dumping methods becomes difficult or impossible.

Various thawing methods and apparatus have been proposed in the Prior Art. Early thawing efforts described in U.S. Pat. No. 2,507,775 included the building of wood fires under the cars, the holding of gas jets against the sides of the cars in various places, and the use of steam baths to which parts of the car or the whole car were subjected. These methods have, however, proven unacceptable since they either subject the rail car to excessive localized temperatures which can cause buckling or other serious structural weakening of the car, distruction of the paint on the car, and/or inpart insufficient heat to the car and its contents to insure thorough thawing of the material contained therein.

Modern attempts at providing economic and efficient railway car thawing systems have utilized electrical energy heating devices to fullfill the thawing function. Thus, as is disclosed in U.S. Pat. No. 3,569,657 microwave energy is emitted through an access opening provided in the bed of a transport vehicle such as a truck trailer of a railway vehicle car, with the transport vehicle then serving as a microwave cavity for heating the contents thereof. However, this microwave heating system would appear to find utility only with special purpose vehicles specifically provided with microwave access openings, with the vehicles being closed to provide the requisite microwave cavity. Thus, in order to implement this system on a large scale, a massive capital expenditure would be required of the railroad industry to refurbish existing rail coal cars and the like.

Yet another modern railway car thawing system disclosed in U.S. Pat. No. 3,800,858 achieves thawing by heating the sidewalls and bottom of the railcar, and the exposed upper surface of particular matter contained therein, by means of infra-red generating heaters suitably positioned to radiate heat to the various surfaces. However, this technique again relys on heating of the vehicular container and thus therefore suffers to some extent for the same reasons as discussed above.

SUMMARY OF THE INVENTION

Accordingly, it is an object of this invention to provide a novel method and apparatus for thawing materials contained in containers such as gondola rail cars, trucks, etc., by which frozen materials in the container can be rapidly, safely, and economically thawed for immediate discharge from the container.

Yet another object of this nvention is to provide a novel thawing method and apparatus employing a closed but well ventilated system, resulting in safe and efficient thawing.

Yet another object of this invention is to provide a novel thawing method and apparatus employing standard hydraulics for use in mechanical positioning, by which the thawing process can be almost totally automated.

A further object of this invention is to provide a novel method and apparatus for thawing, capable of immediate application to existing vehicular containers without the necessity of alteration or refurbishment of the container.

A further object of this invention is to provide a novel method and apparatus for thawing which employs short thawing cycle times, and results in decreased energy consumption.

Another object of this invention is to provide a novel method and apparatus for thawing using microwave energy to heat and thaw materials contained in a vehicle gondola container, which is sufficiently versatile to accommodate containers of varying lengths.

A further object of this invention is to provide a novel method and apparatus for thawing employing plural magnetrons to produce a requisite amount of energy for the heating and thawing of the material contained in a vehicular gondola container, and employing microwave shielding to protect against radiation leakage during the thawing process.

Another object of this invention is to provide a novel method and apparatus for thawing materials, employing plural magnetrons to produce microwave energy for heating and thawing of the materials, wherein the service life of the magnetron is assured by means of appropriate cooling techniques.

These and other objects are achieved according to the invention by providing a novel method and apparatus for thawing materials stored in a gondola-type container having an open top face, which includes a shielding hood having an opened face dimensioned to match the top open face of the gondola-type container. The shielding hood is lowered over the container in contact therewith to form a shielded microwave heating cavity in combination with the container. Plural microwave radiating elements, such as magnetrons, are mounted in the shielding hood for irradiating the materials within the container with microwave energy upon contacting emgagement of the respective open faces of the shielding hood and the container.

The shielding hood is supported from an overhead frame and precisely positioned automatically over the gondola container. A knitted mesh shielding having high compressability and resilience is attached around the perimeter of the open face of the shielding hood to make contact with the mating surface of the gondola container. Additionally, the shielding hood and the associated knitted mesh shielding, is adjustable in length to accommodate gondola containers of differing lengths. Furthermore, a major portion of the shielding hood is provided with a parabolic reflector for focusing microwave radiation more efficiently into the gondola-type container, and more particularly, the material therein contained.

Microwave radiating magnetrons are mounted at selected locations in the hood to assure complete heating of the material within the container. Optionally, at least one of these magnetrons can be movable within the hood for the purpose of scanning the gondola-type container during the heating process. Each of the microwave radiating magnetrons is, however, adequately cooled to assure optimum performance and an acceptable operation life for the magnetrons, in spite of the high radiation level produced by the magnetrons.

An important feature of the invention resides in the extraordinary safety provisions provided, which are necessitated by the high radiation level experienced during the heating process. Thus, the invention envisions the use of a totally enclosed metal building to surround the gondola-type container and the shielding hood, with a grounding grid connecting the building to the earth through RF traps. Additionally, a water pool is maintained within the metal building beneath the gondola container to absorb any possible stray microwave leakage. Additionally, means are provided for evacuating any gaseous products which may be formed in the microwave cavity formed by the shielding hood and the gondola-type container during heating of the contents of the container.

BRIEF DESCRIPTION OF THE DRAWINGS

A more complete appreciation of the invention and many of attendant advantages thereof will be readily obtained as the same becomes better understood by reference to the following detailed description when considered in connection with the accompanying drawings, wherein:

FIG. 1 is a perspective view of the apparatus of the invention in relation to a gondola-type rail car containing material to be heated;

FIGS. 3a and 3b are schematic sectional side views of the shielding hood of the invention, taken along lines 3a—3a and 3b—3b, respectively of FIGS. 2a and 2b, respectively;

BRIEF DESCRIPTION OF THE PREFERRED EMBODIMENTS

Figure 2A:
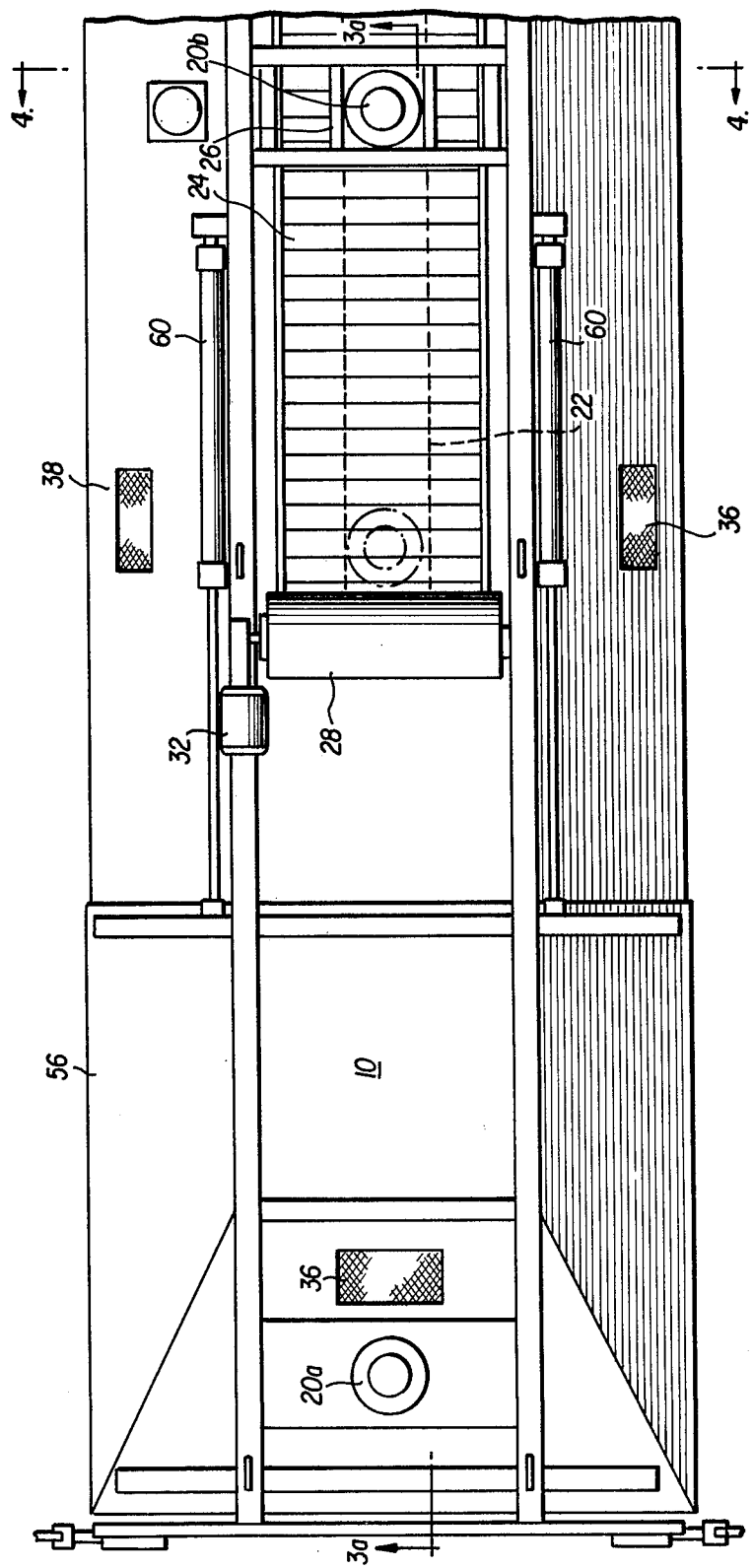
FIGS. 2a and 2b are schematic plan views of left and right halves of the shielding hood of the invention, respectively.

Referring now to the drawings, wherein like reference numerals designate identical or corresponding parts throughout the several views, and more particularly to FIG. 1 thereof, there is shown in perspective view the shielding hood 10 of the invention in relationship to a gondola-type rail car 12. The hood 10 is shown suspended from a hood carrier frame 14 which is connected to a plurality of hydralically operated vertical positioning cylinders 16 which are ultimately attached to the building frame (not shown) of the building within which the microwave thawing operation takes place. Shown within the rail car 12 is a material 18 which is to be heated as a result of the application of microwave energy thereto, as generated by a plurality of microwave energy radiating elements, magnetrons 20, spaced along the length of the hood 10 and mounted thereon.

Figure 2B:
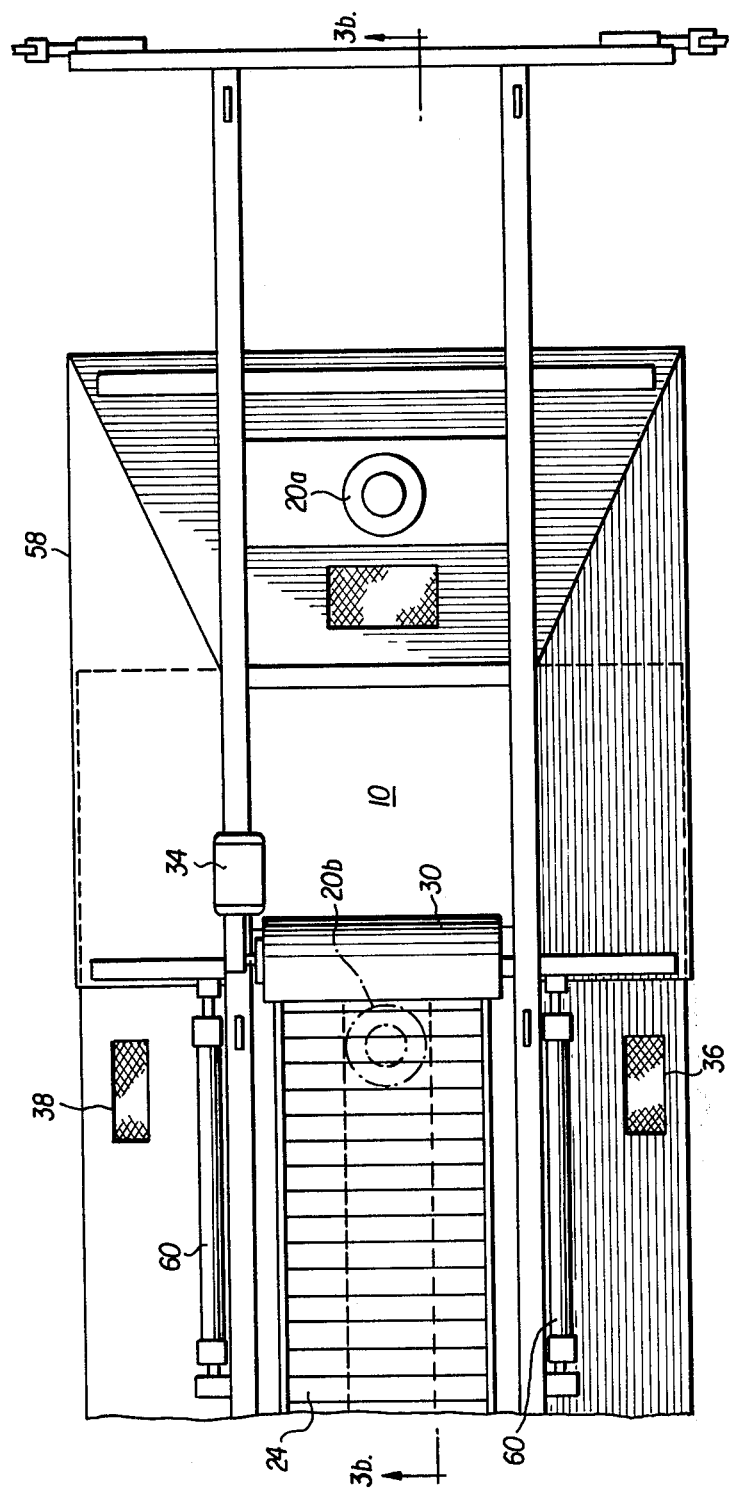

As shown in FIGS. 1 and 2, a total of three magnetrons 20 are mounted in the shielding hood 10, with two magnetrons 20a fixidly located at either end of the hood 10, and a third magnetron 20b movable laterally along the longitudinal axis of the hood 10 in a middle portion thereof. To accommodate the movable magnetron 20b, a slot 22 is formed in the hood 10 along the travel path of the magnetron 20b such that the radiating element of the magnetron 20b communicates with the interior of the hood 10. Thus, during operation, the movable magnetron 20b is transported along the length of the hood, thereby assuring microwave radiation of all the material 18 contained in the car 12. Alternatively, instead of having a movable magnetron 20b, a plurality of stationary magnetrons 20a can be provided along the entire length of the hood 10.

The travelling magnetron 20b is mounted in a slatted rolling cover 24, the individual slats of which are made of steel. The cover 24, provided with a carriage 26 on which the magnetron 20b is mounted, is rolled onto, and off of, a pair of cylindrical hooded drums 28, 30 depending upon the direction of motion of the magnetron 20b. Drive motors 32 and 34 are respectively coupled to hooded drums 28 and 30 to initiate the rolling of the slatted cover 28 and the resulting travel of the carriage 26 having the magnetron 20b mounted thereon.

Figure 4:
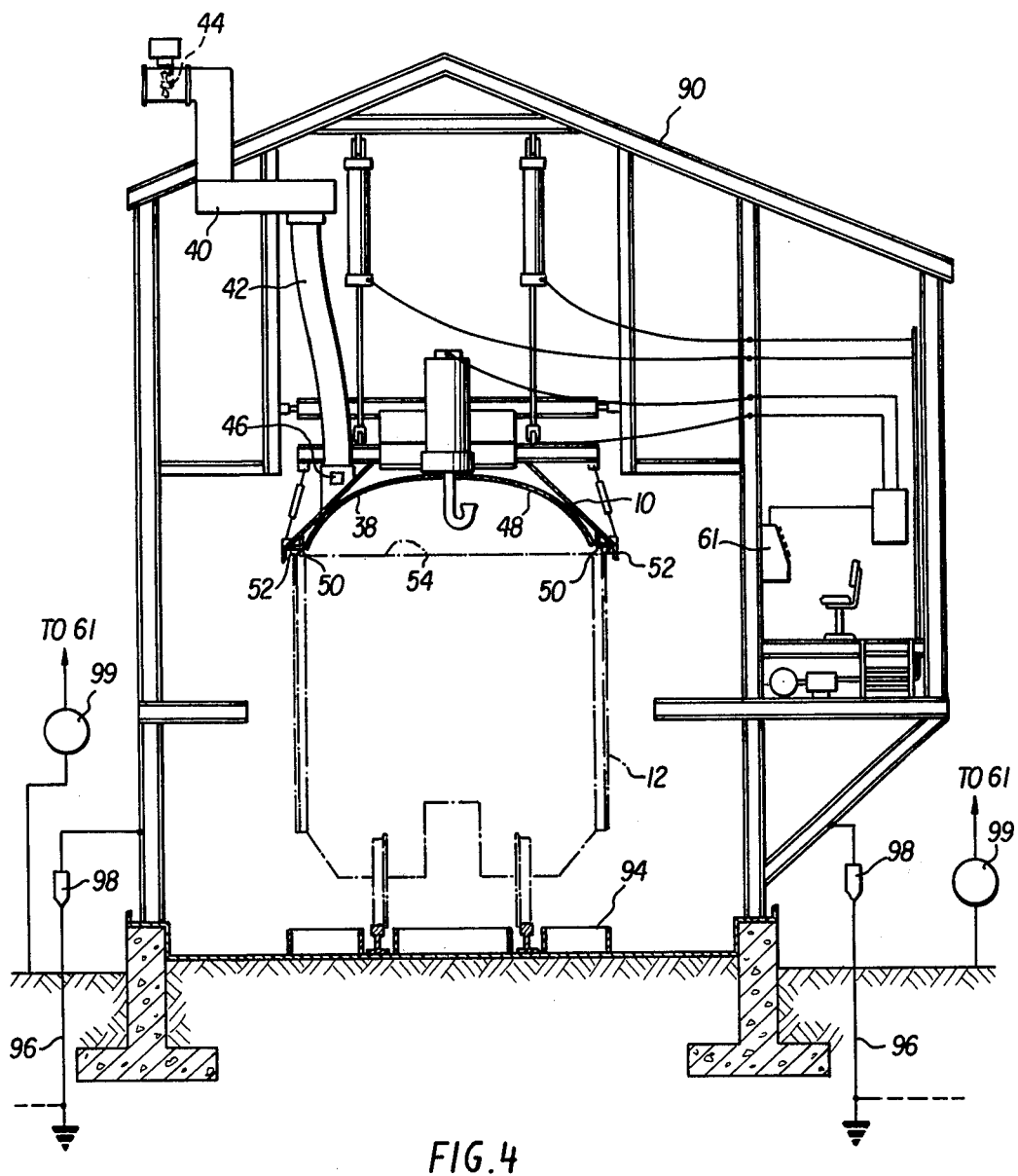
FIG. 4 is a schematic sectional end view taken along the lines 4—4 of FIG. 2a, illustrating the shielding hood of the invention in relation to the gondola-type rail car, and further illustrating the safety provisions of the invention.

As shown in FIGS. 2 and 4, the shielding hood 10 is provided with a plurality of air inlet grills 36 at predetermined points, and a centrally located hood exhaust grill 38 which communicates with an exhaust plenum 40 via a flexible duct 42. Each of the air inlet grills 38 and the exhaust plenum 40 is provided with steel mesh shielding to minimize microwave radiational leakage therethrough. A belt driven axial exhaust fan 44 is located in the exhaust plenum 40, by which gases released by the material being thawed are exhausted from the microwave cavity formed by the shielding hood 10 and the rail car 12. A methane detector 46 is built into the exhaust duct 42. for detecting the presence of methane, and for shutting down the system operation in the event that unacceptably high traces of methane are detected within the microwave cavity.

The interior of at least a central portion of the hood 10 is provided with a parabolic reflector 48 to facilitate energy distribution and even thawing of the material 18 in the car 12. Additionally, the hood 10 is provided with a knitted mesh shielding 52 attached to the perimeter of the open face 50 of the hood 10. The hood peripheral shielding 52 is designed to make contact with the mating peripheral top surface 54 of the container car 12 during the thawing process. Shielding 52 is constructed of of a metal alloy such as a corrosive resistant alloy sold under the trademark Monel, which is an alloy of predominantly nickel and copper, and very small percentages of carbon, manganese, iron, sulfur and silicon, sometimes also containing small percentages of aluminum, titanium and cobalt, or an alloy sold under the trademark Ferex by Metex Electronic Shielding Group, Edison, New Jersey, which is formed of tin plated copper cladded steel wires, or other acceptable materials.

Figure 3B:
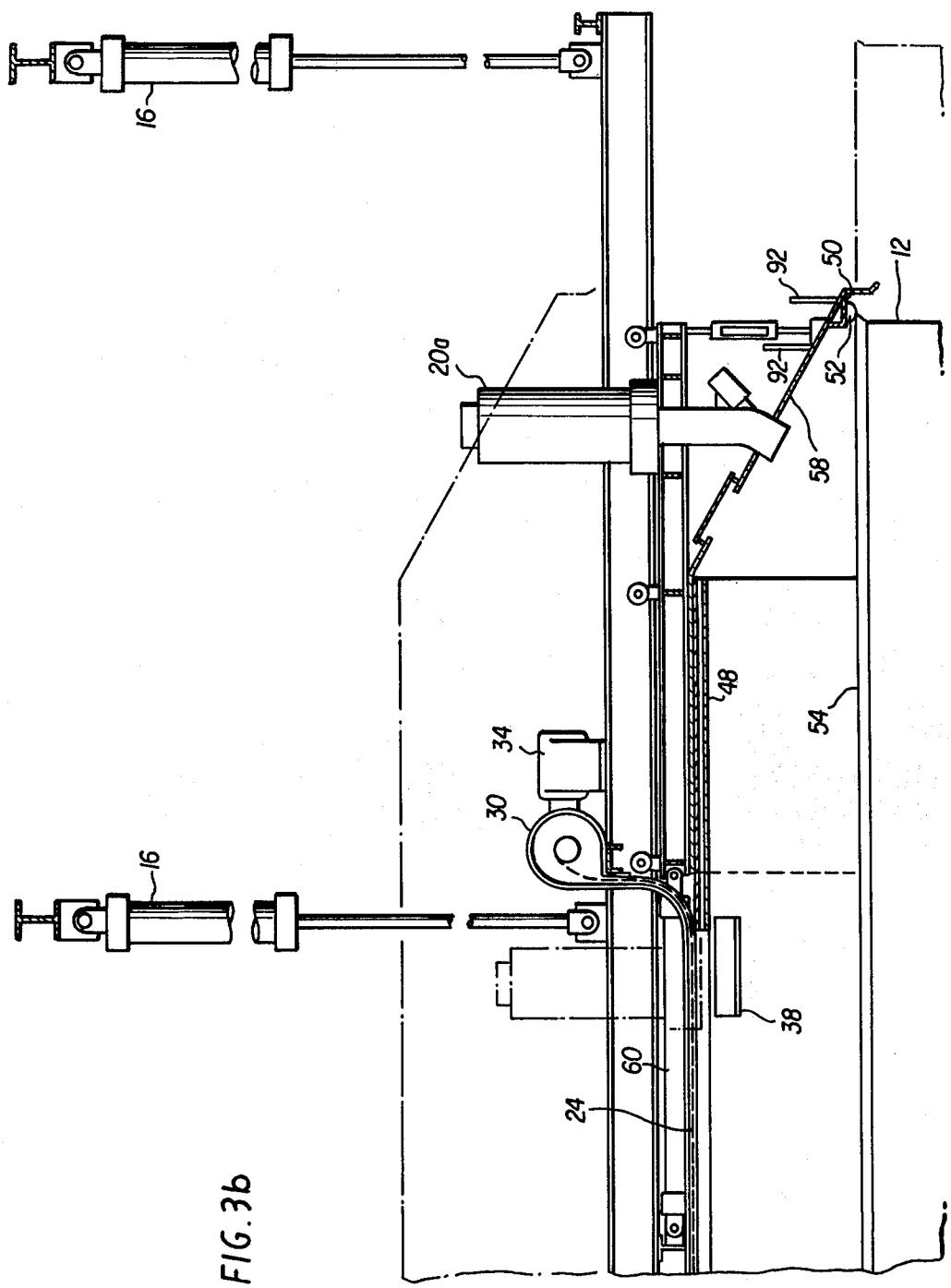

As shown in FIGS. 2 and 3, the shielding hood 10 is provided with telescoping end portions 56 and 58 which are extendable to accommodate container cars of varying lengths, usually between 38 and 50 feet. Thus, hydraulically operated hood extension cylinders 60 are connected to the hood end portions 56 and 58 for adjusting the length of the shielding hood 10 to precisely accommodate the length of a particular container car. As shown in the drawings, the parabolic reflector 48 for simplicity sake is retained within the central portion of the shielding hood 10, and not within the extendable end portions 56, 58. Naturally, depending upon the degree of complexity desired, the parabolic reflector 48 can likewise be designed to be extendable along with the end portions 56, 58. It is noted that while the shielding hood 10 of the invention is defined in terms of longitudinal extension, to accommodate container cars 12 of different lengths, it is not typically required to vary the width of the shielding hood 10, since most container cars have a common predetermined width. Nevertheless, a shielding hood 10 of the invention can easily be implemented such that the width thereof is variable, in the event that the apparatus of the invention is to be used in conjunction with container cars 12 of different widths.

The microwave radiation devices 20 are fixed-tuned, electromagnetically focused, liquid-cooled, ceramic-metal magnetrons capable of generating useful continuous RF power, at an output of as much as 30 kilowatts, at very high efficiency, depending upon the particular application. Typical maximum ratings of the magnetrons 20 considered for the disclosed thawing operation are now summarized as follows:

| CW Oscillator-Magnetron Maximum Ratings, Absolute-Maximum Values: | | | | |
|---|---|---|---|---|
| DC Anode Voltage | | | 14 kV | |
| Anode Current | | | 3 A | |
| Anode Dissipation | | | 15 kW | |
| Load VSWR: | | | | |
| At a power output of 30 kw | | | 1.1:1 | |
| At a power output of 25 kw | | | 2.5:1 | |
| At a power output of 20 kw | | | 3.0:1 | |
| Typical Operation: | | | | |
| At 915 MHz | | | | |
| AC Filament Voltage | 11.7 | 11.4 | 11.4 | V |
| Filament Current | 105 | 100 | 100 | A |
| DC Anode Voltage | 12.5 | 12.5 | 12.6 | kV |
| Anode Current | 1.0 | 2.4 | 2.8 | A |
| DC Electromagnet Current | 1.8 | 3.1 | 3.1 | A |
| Useful Power Output | 10 | 25 | 30 | kW |
| Efficiency | 80 | 83 | 85 | T |
| General Data | | | | |
| Electrical: | | | | |
| Filament, Tungsten Coil: | | | | |
| AC Supply Voltage | | | 12.5 V | |
| Current at 12.5 Volts | | | 115 A | |

Such magnetrons are commercially available from Toshiba Corporation, Model No. IM70A.

Before further discussing other details of the thawing apparatus and method of the invention, it is firstly noted that in order to provide proper operation of the thawing process, the top rail or surface 54 of the container car 12 must be clean of all paint, rust, mill scale or other foreign material. In order to rapidly and efficiently prepare the top rail 54, the present invention incorporates an automatic cleaning operation of the top rail 54 prior to the engagement of the shielding hood 10 with the car 12. In order to enhance cost effectiveness, an automatic wire brush operation controlled by a dedicated microcontroller (not shown) is interfaced with a master microprocessor module 61, which otherwise also controls the entire thawing operation, is employed.

Figure 5:
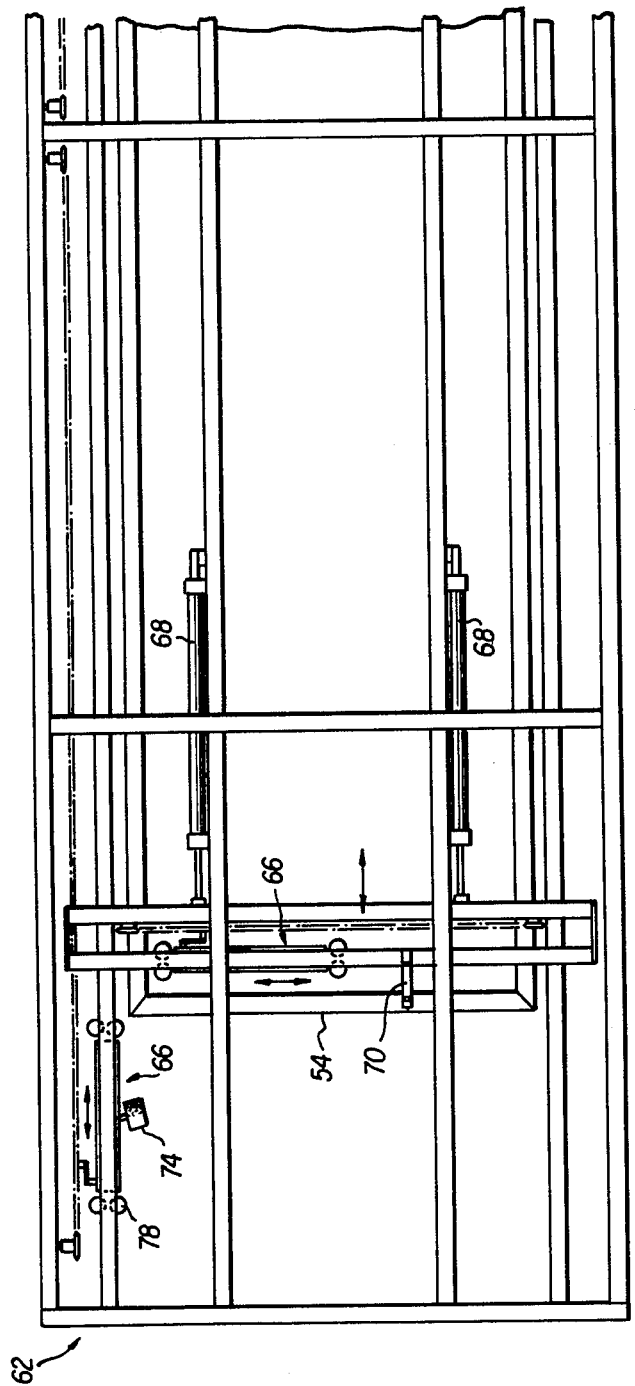
FIG. 5 is a schematic plan view of a brush roller frame and assembly used in preparing the top rail or flange of the gondola-type container prior to initiation of the heating process.
Figure 6:
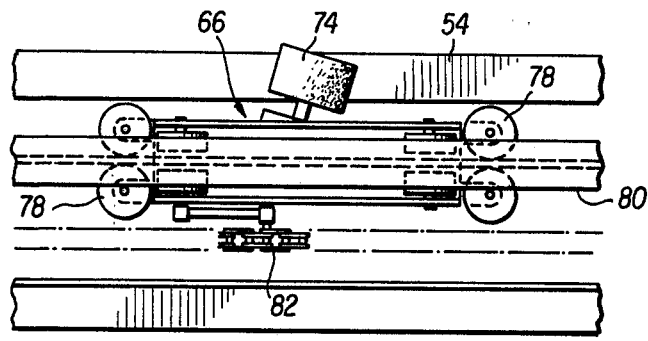
FIG. 6 is a detailed schematic plan view of a particular one of the brush carriages shown in FIG. 5.
Figure 7:
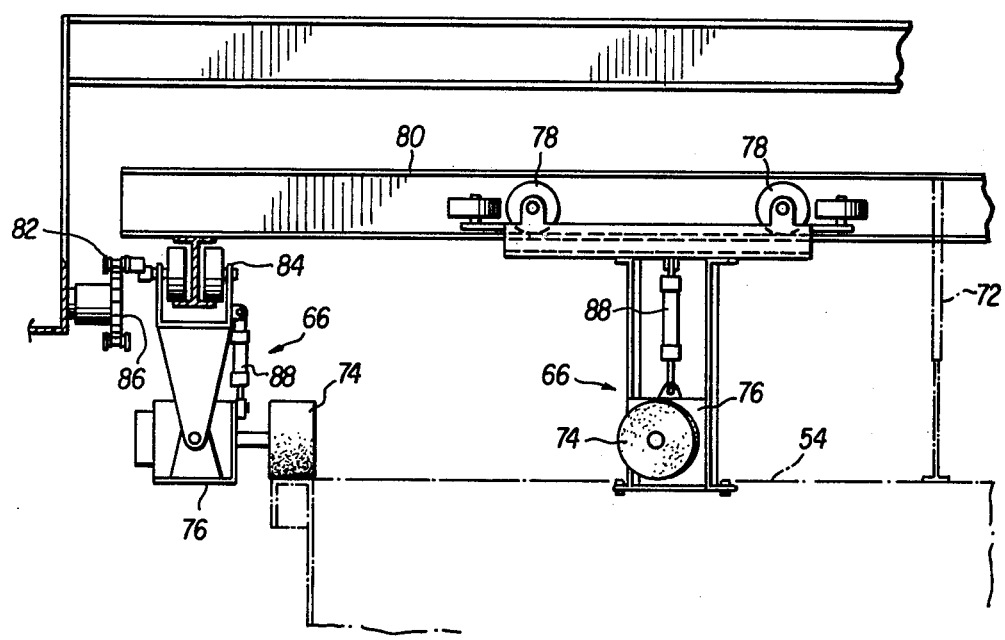
FIG. 7 is a schematic sectional view taken along the lines 7—7 shown in FIG. 5.

The rail cleaner, shown schematically in FIGS. 5-7, includes an overhead structured steel frame support 62 on vertical hydraulic cylinders (not shown).

Initially, the car is propelled conventionally into position in the cleaning area. As the car enters the cleaning area the length of the car is automatically detected, using conventional UV beam technology interfaced with the master microprocessor module 61 located in a main control room.

To provide the required cleaning, at least four cleaning brush assemblies 66 are mounted on the ends and the sides of the frame 62. Upon determination of car length, the cleaner assemblies 66 located at the ends of the frame 62 are appropriately positioned by means of hydraulic cylinders 68 under the control of car limit sensors 70, and the cleaning frame 62 is then hydraulically lowered by means of the vertical hydraulic cylinder to car top rail 54. Vertical travel is terminated by a signal produced by pressure transducer 72 attached to the frame 62. Thereafter, the transducers 72 are repositioned to permit unrestricted cleaning of the top rail 54.

Each cleaning brush assembly 66 includes a wire brush 74 activated by means of a constant displacement, vane type hydraulic motor 76. The wire brushes 74 are isotemp straight wire twisted to provide tufts for high impact and long brush life. The brushes 74 are mounted on a motor shaft extension of the motor 76 which is skewed approximately 5° with the perpendicular axis of travel to provide additional scrubbing action. Each hydraulic motor 76 is attached to an eight wheeled carriage 78, which is movable on an "I" beam 80 associated with the frame 62. Each carriage 78 is moved horizontally along the car rail surface 54 by means of a link chain 82 driven by an electrically operated speed reducer 84. Associated with the link chain 82 and the speed reducer 84 are sprockets 86 by which the link chain is driven. During operation, two cleaning passes are made by each brush assembly 66, with the direction of the carriage 78 on which is mounted the brush 74 being reversed upon the reaching of the carriage 78 to a drive sprocket. The travel of the brushes 74 is controlled in order to avoid conflict between the various brushes at common point of travel, and brush pressure against the surface 54 is furthermore controlled by a pneumatic cylinder 88 under the control of the microprocessor module 61.

Upon completion of cleaning of the top surface 54 of the car 12, the cleaning frame 62 is raised under the control of the dedicated microcontroller, and the surface is visually inspected. If the surface preparation of the car top rail is satisfactory, the operator presses the button which signals the microprocessor that the cleaning operation has been completed, and that the car is ready for the thawing sequence.

After completion of the cleaning process, the car 12 is thereafter precisely positioned in the vicinity of, and beneath, the shielding hood 10 by conventional pressure transducers and/or optical detectors (not shown) within a steel plated shielding building 90. After positioning of the car 12, which is performed under the control of the master microprocessor module 61, the building 90 is scanned by means of a low power laser which emits beams to associated mirrors, beam splitters, reflector trihedral prisms and retro-reflectors to an emission detector (not shown) to detect the presence of any personnel within the building 90. Should beam continuity from the laser to the emission detector not be obtained, the microprocessor module 61 provides an audial and visual warning and operation is halted. Thereafter it is necessary to manually reactivate the sequence, whereupon the building 90 is again scanned to detect the presence of personnel.

Once a safe condition is indicated, i.e. no personnel within the thawing area of the building 90, the shielding hood 10 is hydraulically positioned over the top rail 54 of the car 12 by limit sensors 92 placed around the periphery of the hood 10 to terminate hood travel and insure proper contact pressure between the hood peripheral shielding 52 and the car 12. Once the hood 10 has been properly positioned, as evidenced by the input from the transducers 92 to the microprocessor module 61, the microprocessor module 61 activates the hood exhaust fan 44 and energizes the methane detector 46 built into the exhaust duct 42.

Degressing now from the description of the operation of the thawing sequence, nextly described are further structural details of the apparatus of the invention.

In keeping with the above stated object of providing a completely safe operation, extensive shielding is provided. Already discussed in that regard is the hood peripheral shielding 52, and the shielded hood inlet grills 36 and exhaust 38. Additionally, the magnetrons 20 and their associated power supplies, discussed hereinafter, are also shielded in such a way to provide maximum attenuation and minimum leakage of RF power generated within the microwave cavity defined by the hood 10 and the container 12. Furthermore, the floor of the building 90 underneath the positioned container 12, is constructed of carbon steel plate and includes a pan 94, or containment vessel, to hold water released from the bottom of the car 12 during the thawing operation. This containment vessel shall have a controlled discharge to regulate and maintain the water levels contained therein, such that this water absorbs any stray radiation leakage from the edges of the dumping doors which are normally provided on the bottom of a conventional rail car 12. Also, the sides of the containment vessel 94 are continuously grounded to the metal building 90, while the area of the building 90 containing the hood 10, the magnetrons 20, and magnetron power supplies shall be constructed of a totally enclosed structure 90 with appropriate shielding precisely placed to provide maximum shielding and integrity while maintaining rigid mechanical tolerances. Thus, the building 90 is essentially an RF enclosure.

To further enhance safety, a grounding grid 96, schematically shown in FIG. 4, is constructed adjacent to the building to provide maximum reduction of (ENI-RFI) radiation generated within the building. The grounding grid 96 is connected to the building through selective RF traps 98 to attain maximum attenuation of specific frequencies generated within the building. Additionally, plural RF detectors 99, under the control of the microprocessor 61, are disposed exterior to the building 91 to detect residual radiation leakage, if any. Thus, if predetermined leakage limits are exceeded, the RF detectors 99 signal this fact to the microprocessor, and energization of the magnetrons 20 is then curtailed. The grounding grid 96, the RF traps 98, and the RF detectors 99 are of conventional design.

Figure 8:
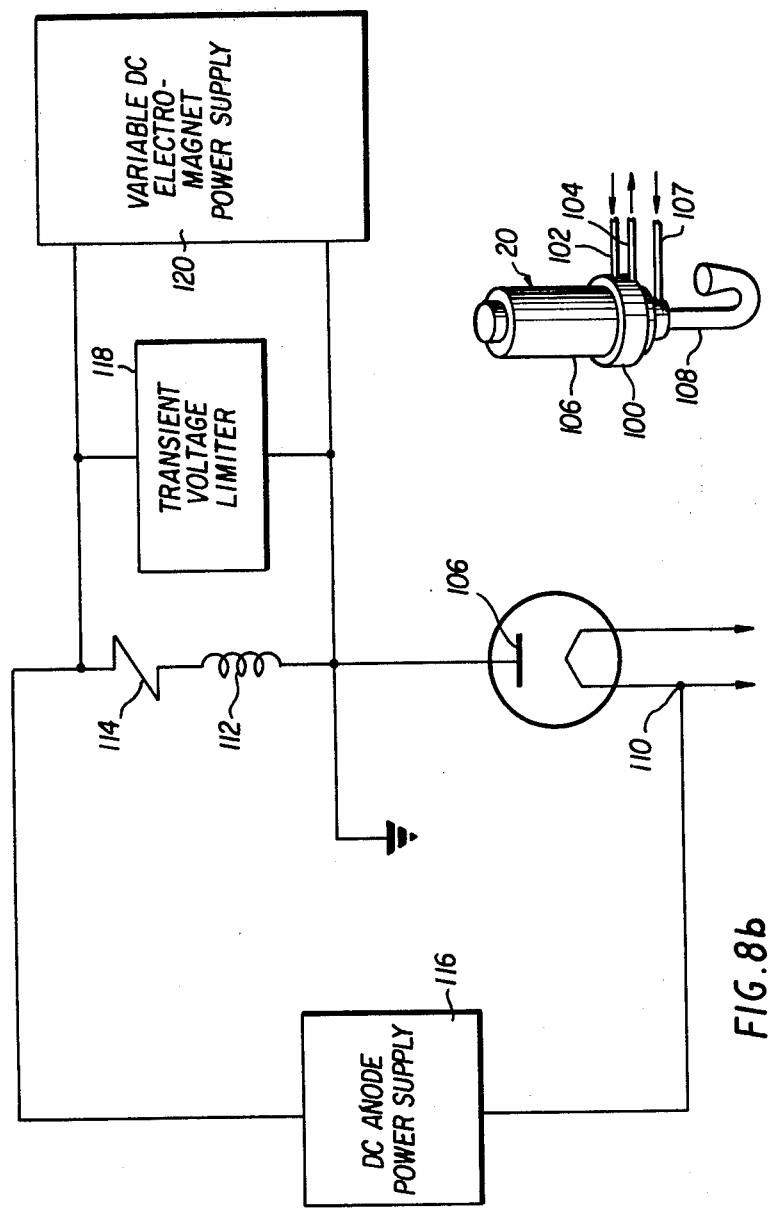
FIG. 8a is an illustration of selected magnetron details.
FIG. 8b is a block diagram of DC power circuits for use with a series-connected electromagnet in applying power to any one of the magnetrons mounted in the shielded hood of the invention.
Figure 9:
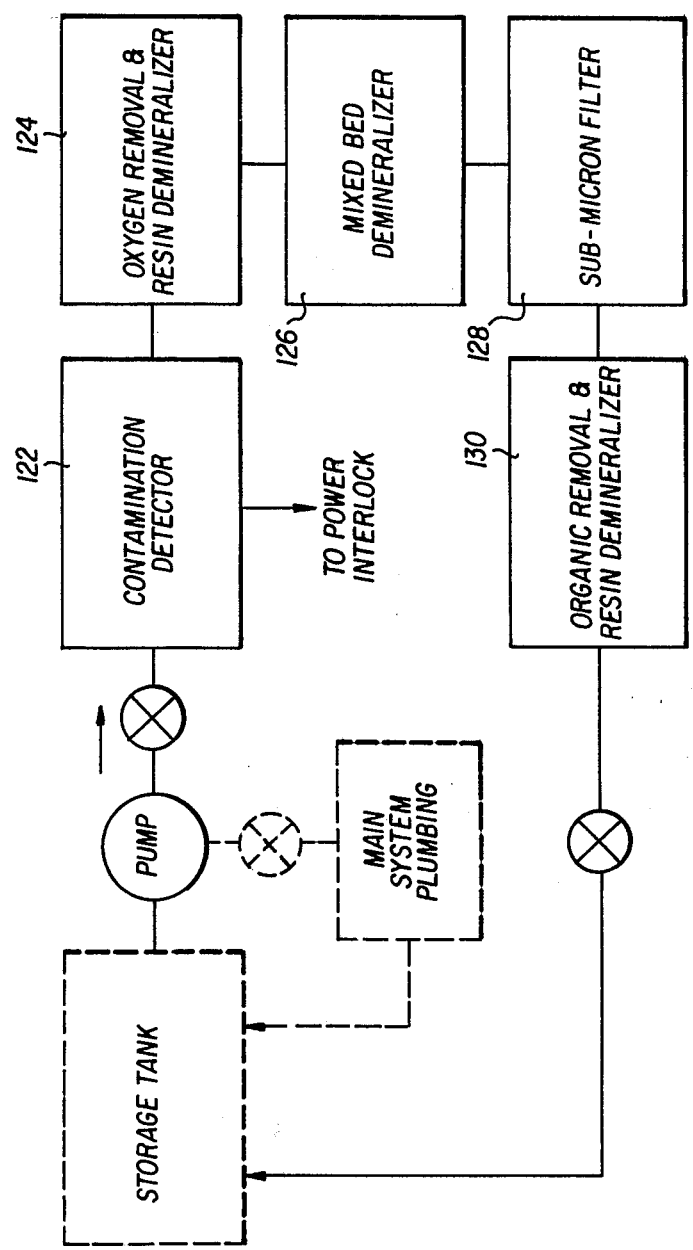
FIG. 9 is a block diagram of a liquid regeneration loop used in cooling of the magnetrons of the invention.

As noted above, electromagnetically focused magnetrons 20 are used as the microwave radiating elements. Selected magnetron details are schematically shown in FIG. 8a, while FIG. 8b illustrates the electrical connection of DC power circuits to a magnetron 20. In FIG. 8a, the magnetron is seen to include a cooling jacket 100 having input and output cooling fluid lines 102 and 104, respectively. The magnetron cooling scheme employed by the invention, selected details of which are shown in FIG. 9, discussed hereinafter, normally uses water as the cooling fluid. The cooling jacket 100 is located in the vicinity of the anode 106 from which the magnetron delivers a microwave output to the oscillating wave guide and horn 108 shown in FIG. 8a. The magnetron also includes an anode air-preheating input 107, connected to a conventional heater (not shown), by which the magnetron anode 106 is preheated during magnetron start-up.

As shown in FIG. 8b, the magnetron anode 106, and a magnetron cathode-filament terminal 110 are connected in series with an electromagnet coil 112, and undercurrent relay 114 which prevents $\pi-1$ mode operation, which in turn is connected to a DC anode power supply 116. Connected in parallel to the coil 112 and the relay 114 is a transient voltage limiter 118 and a variable DC electromagnet power supply 120.

The positioning, mounting, and securing of the magnetrons 20 vary depending upon the specific magnetron employed. For these details, therefore, reference must be made to the manufacture's published data. Nevertheless, provisions should be made to avoid subjecting the magnetron to appreciable shock or vibration during handling and operation thereof.

Normally, high power magnetron tubes employ low-voltage, high-current filaments or heaters coupled to the cathode structure of the tube.

It is therefore recommended that electrical connections between the heaters and the cathode filaments be kept short to minimize voltage drop. Once again, however, manufacturers published data should be consulted for precise filament connection details.

Flexible contacts are recommended for the RF connections to the magnetron to compensate for thermal expansions, eccentricities, and variation in the manufacturing dimensions of circuit components in tubes. The spring-contact type of connectors is recommended for RF terminals having cylindrical contact surfaces. A compressable metal braid may be used for RF terminals having flat contact surfaces.

When power is applied to the magnetron tube, as suggested above, there may be some motion of various parts of the tube and their associated circuits due to thermal expansion. In order that no undue stress be placed on the ceramic-metal seals of the tube, the electrical connectors to the tube should be flexible. The connecting leads and hoses should be installed so that a slack portion thereof have sufficient clearings to prevent arcing to the tube or circuit parts, and where applicable, leads should be dressed to minimize feed-back capacity.

As noted above, the preferred embodiment of the invention employs liquid-cooling of the magnetron 20 to prevent failure of the magnetron as a result of the excessive heat dissipation occuring during operation. The liquid-cooling system includes, in general, a source of cooling liquid, a liquid regeneration loop, flow regulators, gages, a feed-pipe system which carries liquid to the input and output lines 102 and 104 of the tube, and flow switches for interlocking the tube power supplies with the liquid flow through the coolant courses.

It is essential that coolant tubing between the cooling system piping and each of the high-voltage cooling connectors has good electrical insulating qualities and is of sufficient length to minimize leakage currents and/or electrolysis effects.

Generally, the coolants piping system is arranged so that the direction of coolant flow through the various coolant connections of the magnetron is in accordance with the manufacturers published data. Series or parallel arrangement of the coolant ducts is permissible, so long as the specified flow, pressure, and outlet temperature ratings are observed.

Proper functioning of the cooling system is of the utmost importance to avoid damage to the magnetron tube, since even a momentary failure of coolant liquid flow can result in a distribution of the tube. In fact, in some tube types, the heat generated by the cathode filament is sufficient alone to cause serious damage in the event of coolant failure. It is therefore necessary to provide a technique for preventing operation of the magnetron tube 20 in the event of failure in the coolant supply.

An accepted technique to protect against coolant failure involves the use of coolant-flow interlocks which open the primary circuits of the power supplies, with the exception of an electronic high-vaccum pump supply (not shown), when the flow through any element is insufficient or ceases. In the event of an interruption, it is recommended that the interlock system be designed such that it is necessary to return the heater or filament voltage to zero and to restart energization of the magnetron in the normal manner. Clearly, coolant flow must be initiated before application of any voltages to the magnetron, and preferably should continue for several seconds after removal of all voltages.

The absolute minimum coolant flow required through the coolant ducts and the pressure differentials across the cooled elements are given in the manufactures published data. The use of an outlet coolant thermometer and a coolant flow meter at each of the outlets is also recommended. Under no circumstances should the temperature of the coolant from any outlet ever exceed the maximum value given in the published data.

In spite of the usual precautions taken to eliminate contamination of the coolant by oil, dust, etc., some impurities are likely to enter the cooling fluid. Therefore, the use of a strainer having at least 60-mesh screen is recommended in the coolant supply line as near to the tube as possible to trap any foreign particles likely to block the coolant flow through the lines 102, 104. Additionally, a regeneratition loop, as shown in FIG. 9, should also be employed. The size of the regenerating components depends on the operating perimeters of the system and the coolant volume. For example, a regeneration loop having a 10–20 gallon per hour capacity will usually be adequate for use with a cooling system containing approximately 50 gallons of cooling fluid. Once again, the manufacturers published data should be consulted for selecting the appropriately sized regenerating components.

The quality of the cooling fluid is maintained by the regeneration loop only when the fluid system is in operation. When the system is turned off, air begins to enter the fluid which triggers a sequence of contamination (both chemical and bacterial). Therefore, precaution should be taken to circulate the cooling fluid during the inoperative period of the electronic system by use of an auxiliary pump. Following prolonged shut-downs, the fluid system should be put in full operation for some time before energization of the magnetrons to eliminate any accumulated contamination.

For availability in ease and handling, water is recommended as the coolant wherever possible. The use of other coolants, such as a mixture of ethylene, glycrol, and water, may be required in specialized applications whether where there extends a hazard of coolant freezing.

Common coolant contaminants which are conductive to scale formation in the cooling plumbing system include oxygen, carbon dioxide, metal ions, and organic solids. In a well-maintained system, the following contaminants should not be present in excess of the following concentrations:

| Copper | 0.05 part per million by weight |
| --- | --- |
| Oxygen | 0.5 part per million by weight |
| Carbon Dioxide | 0.5 part per million by weight |
| Total Solids | 3.0 part per million by weight |

Although an accurate chemical analysis is the absolute method of checking system water quality, a measurement of the water resistivity may be used as a guide for determining the presence of ionized contaminants, since dissolved gases, metals and other contaminants reduce the resistivity of the coolant fluid in varying amounts. Similarly, the pH of the water offers another tool for detecting excessive contamination, since if the pH of water is outside the range of 6.8–7.2, the water contains excessive contaminants. In general, plate-water-column (water path between plate and ground) resistance should be maintained to a value not less than 4 megohms, per kilowat of plate voltage, or 10 megohms, whichever is less at water temperatures of 25° C. in order to minimize electrolysis.

A suggested liquid regeneration loop as shown in FIG. 9 to include a contamination detector 122, which may be based on coolant resistivity, pH, or other suitable factors, and oxygen removal and resin demineralizer 124, a mixed bed demineralizer 126, a sub-micron filter 128, and an organic-removal and resin demineralizer 130, each connected in series between a fluid storage tank, a system pump, and the main system plumbing.

As is typical in the high power microwave art, it may be necessary to employ forced-air cooling of the external surfaces of the magnetrons in order to maintain the surface temperatures thereof below prescribed maximum ratings. The forced air system, if employed, can be electrically interconnected with the high voltage power supplies via air flow interlocks which remove high voltage from the magnetron in the event of detected overheating or in the event of insufficient air flow.

Super power tubes, like most power tubes, required a mechanical protective devices such as interlocks, relays, and circuit breakers. However, circuit breakers alone may not provide adequate protection in certain super power-tube circuits when the power-supply filter, modulator, or pulse-forming network stores considerable energy. Additional protection may then be achieved by the use of high-speed electronic circuits or electronic "crowbars" to bypass the fault current until mechanical circuit breakers are opened. These "crowbar" circuits may employ a controlled gas tube, such as a thyratron or ignitron, depending upon the amount of energy to be handled.

Additionally, the shielding building 90 in which the thawing operation takes place is provided with a protective housing 132 for operative personnel. The housing 132, shown in FIG. 4, houses the master microprocessor module 61, and is arranged such that the operator can oversee the thawing process via a radiation resistant transparent screen 134. The protective housing 132 is designed with interlocks (not shown) so that personnel cannot possibly come in contact with any high-potential point in the electrical system. These interlocks break the primary circuit of the high-voltage supplies and discharge high-voltage capacitors when any gate or door on a protective housing is opened, and prevent the closing of the primary circuit until any such door, for example, entrance doors to the enclosed housing 90, are locked.

Returning now to the description of the thawing sequence, after the car top rail 54 has been cleaned and after the thawing area has been determined as being free of operator personnel, the shielding hood 10 is hydraulically positioned over the top rail 54 by limit sensors, and the hood is then hydraulically lowered. A series of linear motion transducers or similar devices placed around the perimeter of the hood 10 terminate the hood travel and insure proper contact pressure between the hood peripheral shielding 52 and the container mating surface 54. Once the hood 10 has been properly positioned, as evidenced by the input from the transducers, the dedicated controller activates the hood exhaust fan 44, and energizes the methane detector 46 built into the exhaust plenum 40.

Nextly, the microprocessor activates the cooling water system to the electromagnets of the magnetrons 20.

The RF leakage detectors 99 placed around the exterior of the building 90 are nextly energized. When these units are shown to working, preheat amperage is applied to the magnetron anode 106. When 70% of full anode amperage is achieved, anode air heaters (not shown) which had previously been energized at the same time of the activation of the cooling system, are then deenergized.

A microprocessor 61 nextly energizes the electromagnet coils 112 of the magnetrons 20 and the power supply 116 then brings the magnetrons up to 100% operation by applying proper anode amperage and plate voltage. Thereafter the magnetrons 20 operate for a period of from 1–6 minutes as programmed by the operator into the microprocessor 61.

Once the established thawing time limit expires, the magnetron plate voltage is reduced to zero, and the anode ampergage is brought back to preheat level and the electromagnet coil 112 is deenergized.

The microprocessor 61 then activates the resistance heater in the anode air temperature control system and begins the time-out sequence of the cooling water in the cooling system. The anode amperage is nextly dropped to zero, and the laser personnel detection system is deenergized.

The hood exhaust system is deactivated, as is the methane detector, by the microprocessor. The hood 10 is then hydraulically raised to its stand-by position.

The output from the RF leakage detector 99 having been continuously scanned since activation are now turned off if no excessive radiation has been detected. Should excessive radiation be detected at any point during the thawing operation, the microprocessor 61 interrupts the anode plate voltage of each magnetron, and shuts the magnetrons down in a proper sequence. Following shutdown of the detectors 99, another dedicated controller opens the exit doors of the building 90 whereupon the car 12 is propelled outside the building 90 for off loading of the thawed materials 18, e.g. coal.

Obviously, numerous modifications and variations of the present invention are possible in light of the above teachings. It is therefore to be understood that within the scope of the appended claims, the invention may be practiced otherwise and as specifically described herein.

What is claimed as new and desired to be secured by the Letters Patent of the United States is:

1. An apparatus for thawing materials stored in a gondola-type container having an open top face, comprising:

shielding hood means having an open face dimensioned to match the top open face of said gondola container for forming a shielded microwave heating cavity in combustion with said container, said hood means comprising shielding means adjacent the complete periphery of said hood means open face, said shielding hood means adapted to be arranged with said shielding means disposed in contacting engagement with the open face of said gondola container to form a microwave cavity in the space enclosed between said shielding hood means and said container, and, microwave radiation means mounted in said shielding hood means for radiating the materials within the container with microwave energy upon contacting engagement of the respective open faces of the shielding hood means and the container;

whereby the material stored in the container within the microwave cavity formed by the container and the shielding hood means are heated and thawed by the microwave energy produced by the microwave radiation means.

2. An apparatus according to claim 1, wherein the shielding hood means comprises:

a semi-enclosed hood defining said open face of said shielding hood means; and, a parabolic hood reflector disposed along at least a central portion of the hood for focusing microwave radiation produced by said radiation means into said materials to be thawed.

3. An apparatus according to claim 2, wherein:

said hood comprises telescopic end portions extendable to accommodate containers of varying lengths, said parabolic hood reflector located in at least the central portion of said hood between said telescopic end portions thereof, and means for extending the telescoping end portions of said hood to adjust the length of said hood to correspond to the length of said container; and, said microwave radiation means comprises a plurality of magnetrons, at least one magnetron located in each of the telescopic end portions of said hood, and at least one magnetron located in the central portion of said hood.

4. An apparatus according to claim 3, further comprising:

said hood having a slot formed in at least the central portion of said hood, said at least one magnetron located in the central portion of said hood located in said slot;

means for moving said at least one magnetron in said central portion of said hood, said moving means including a movable shield covering said slot except for the at least one movable magnetrons, which is supported on said moving shield and moved thereby.

5. An apparatus according to claim 4, wherein said hood comprises:
a carbon steel plate structure.

6. An apparatus according to claim 4, further comprising:
power supply means for energizing the magnetrons; and,
microprocessor means coupled to said power supply means for controlling the extension of the end portions of the hood to correspond to the length of the gondola-type container, and for controlling the energization of the magnetrons by the power supply means.

7. An apparatus according to claim 3, further comprising:
a shielded housing enclosing the shielding hood and the container during the thawing operation;
means for grounding said shielded housing to earth, including an underground embedded grounding grid and plural RF traps connected between said shielded housing and said grounding grid for attenuating RF radiation leakage impinging from the microwave cavity formed by the hood and the container onto the shielded housing.

8. An apparatus according to claim 7, further comprising:
a plurality of RF radiation detectors positioned outside said shielded housing and interfaced with said microprocessor means such that if a predetermined level of radiation leakage is detected by said RF detectors, energization of said magnetrons by said power supply means is curtailed by said microprocessor means.

9. An apparatus according to claim 8, further comprising:
gas evacuation means for evacuating gases from the microwave cavity formed between said hood and said container and for circulating atmospheric air through said microwave cavity.

10. An apparatus according to claim 9, wherein said gas evacuation means comprises:
plural shielded air inlet grills disposed at selected places on said hood;
at least one shielded gas exhaust grill disposed on said hood;
exhaust plenum means coupling said shielded exhaust grill and said hood to a shielded opening in the shielded housing; and
an exhaust fan coupled to said shielded opening in said shielded housing for evacuating gases from the microwave cavity.

11. An apparatus according to claim 10, wherein said gas evacuation means further comprises:
a detector for detecting the presence of a particular gas within the microwave cavity formed between said hood and said container, said detector located in the exhaust plenum means and coupled to said microprocessor means such that energization of said magnetrons by said power supply means is curtailed in the event that said gas detector detects the presence of said particular gas in excess of a predetermined amount.

12. An apparatus according to claim 7, further comprising:
a water containment vessel situated beneath said container during energization of said magnetrons for holding water released through the bottom the container during the thawing operation; and,
means for maintaning the water level in said containment vessel at a predetermined level;
whereby the water contained in said vessel absorbs stray radiation leakage from the bottom of said container.

13. An apparatus according to claim 6, further comprising:
means for cleaning the top surface of said gondola-type container facing said shielding hood, said cleaning means coupled to, and under the control of, said microprocessor means.

14. An apparatus according to claim 6, further comprising:
cooling means coupled to said magnetrons and said microprocessor for maintaining the temperature of each of said magnetrons below a predetermined level, said cooling means circulating a cooling fluid in the vicinity of said magnetron; and,
cooling fluid regeneration means for maintaining a contamination level of said cooling fluid below a predetermined level.

15. A method for thawing materials stored in a gondola-type container having an open face, comprising:
providing a shielding bond having an open bottom face provided with adjacent shielding material;
providing at least one microwave radiating element within said shielding hood;
adjusting the dimensions of the peripheral open face of the shielding hood to correspond to the open face of the gondola-type container;
positioning the shielding hood over the open face of the container with the shielding material in contacting engagement therewith, thereby forming a completely enclosed microwave cavity in the space enclosed by said hood and said container; and
energizing said at least one microwave radiating element to emit microwave energy into the material contained in said container within said microwave cavity, thereby heating and thawing the material within said container.

16. A method according to claim 15, further comprising:
focusing microwave radiation produced by said radiating element into said materials stored within said gondola-type container.

17. A method according to claim 16, further comprising:
shielding the microwave cavity formed by the hood and the gondola-type container by enclosing said microwave cavity in an RF shielded enclosure;
detecting the presence of microwave radiation leakage exterior to said RF shielded enclosure; and,
controlling the energization of said microwave radiation element in accordance with the microwave radiation leakage detected exterior to said RF shielded enclosure.

18. A method according to claim 15 further comprising:
cleaning the surface of the open face of said gondola-type container prior to engagement with said hood.

19. A method according to claim 15, further comprising:
evacuating gases released from said materials stored in said gondola-type container from the microwave cavity formed by said shielding hood and said container during energization of said microwave radiation element.

* * * * *